United States Patent [19]

Bogar, Jr.

[11] Patent Number: 4,871,099
[45] Date of Patent: Oct. 3, 1989

[54] FISHING ROD HOLDER

[76] Inventor: Earl M. Bogar, Jr., 6 Broad Oaks La., Houston, Tex. 77056

[21] Appl. No.: 211,192

[22] Filed: Jun. 24, 1988

[51] Int. Cl.$^4$ ............................................. A01K 97/10
[52] U.S. Cl. .............................. 224/42.45 R; 43/21.2; 211/70.8; 224/922; 248/512
[58] Field of Search ......... 224/922, 42.45 R, 42.46 R, 224/200, 42.03, 232, 251, 273; 206/207, 579; 43/21.2, 25; 248/512, 513, 519, 535, 37.6; 211/70.6, 70.7, 70.8; 30/151

[56] References Cited

U.S. PATENT DOCUMENTS

| | | | |
|---|---|---|---|
| 2,803,387 | 8/1957 | Pearce | 224/922 |
| 3,007,618 | 1/1959 | Davis et al. | 224/42.45 R |
| 3,421,632 | 1/1969 | Wood | 211/70.8 |
| 3,744,688 | 7/1973 | Kezer | 224/922 |
| 4,157,804 | 6/1979 | Byford | 248/512 |
| 4,485,579 | 12/1984 | Hawie | 248/512 |
| 4,497,129 | 2/1985 | Chestnut | 248/156 |
| 4,537,315 | 8/1985 | Griffen | 211/70.6 |
| 4,541,539 | 9/1985 | Matthews | 220/20 |
| 4,572,416 | 2/1986 | Upham | 224/922 |
| 4,601,400 | 7/1986 | Buchanan et al. | 211/70.7 |
| 4,782,624 | 11/1988 | Head | 43/21.2 |
| 4,785,980 | 11/1988 | Redick | 224/42.03 A |

FOREIGN PATENT DOCUMENTS

| | | | |
|---|---|---|---|
| 1013731 | 7/1977 | Canada | 248/513 |
| 2549554 | 5/1977 | Fed. Rep. of Germany | 211/70.6 |
| 2363282 | 5/1978 | France | 43/21.2 |
| 380999 | 6/1940 | Italy | 224/232 |

Primary Examiner—Renee S. Luebke
Attorney, Agent, or Firm—Fulbright & Jaworski

[57] ABSTRACT

A plurality of vertically extending tubular rod holders connected to a plurality of horizontally spaced supports in which the top of each rod holder includes a first downwardly and inwardly tapered slot and a second downwardly extending slot diametrically opposed to the first slot for receiving and holding a fishing reel. One or more enclosures extend vertically between and are supported from two of the horizontally spaced supports and are shaped to receive the blade of a knife.

2 Claims, 2 Drawing Sheets

FISHING ROD HOLDER

BACKGROUND OF THE INVENTION

It is well known to use one or more vertically extending tubular rod holders connected to supports for holding fishing rods.

The present invention is directed to an improved rod holder which will position and securely hold fishing rods and prevent them from rotating and bouncing around and becoming damaged, and includes supporting structure for other fishing accessories such as knives and pliers.

SUMMARY

The present invention is directed to a fishing rod holder which includes a plurality of horizontally spaced supports with a plurality of vertically extending tubular rod holders connected to and supported from the horizontal supports. The top of each rod holder includes a first downwardly and inwardly tapered slot and a second downwardly extending slot diametrically opposed to the first slot for receiving and holding fishing rods having various types, sizes and shapes of fishing reels.

Still a further object of the present invention is wherein the first slot is in a plane positioned at an angle to the longitudinal axis of the tubular rod holder.

Still a further object of the present invention is the provision of an enclosure extending vertically between and supported from two of said horizontally spaced supports in which the enclosure is shaped to receive a knife blade thereby shielding individuals from inadvertently being cut by the blade.

Yet a still further object of the present invention is wherein the ends of the enclosures are positioned in recesses in the two horizontally spaced supports. Fastening means are provided at at least one end of each enclosure for securing said end to a horizontal support. Preferably, each of the recesses in the horizontally spaced supports include a shoulder for coacting with an end of the blade enclosure. Other types of enclosure fastening means may be provided.

Other and further objects, features and advantages will be apparent from the following description of presently preferred embodiments of the invention, given for the purpose of disclosure and taken in conjunction with the accompanying drawings.

DESCRIPTION OF THE PREFERRED EMBODIMENT

Figure 1:
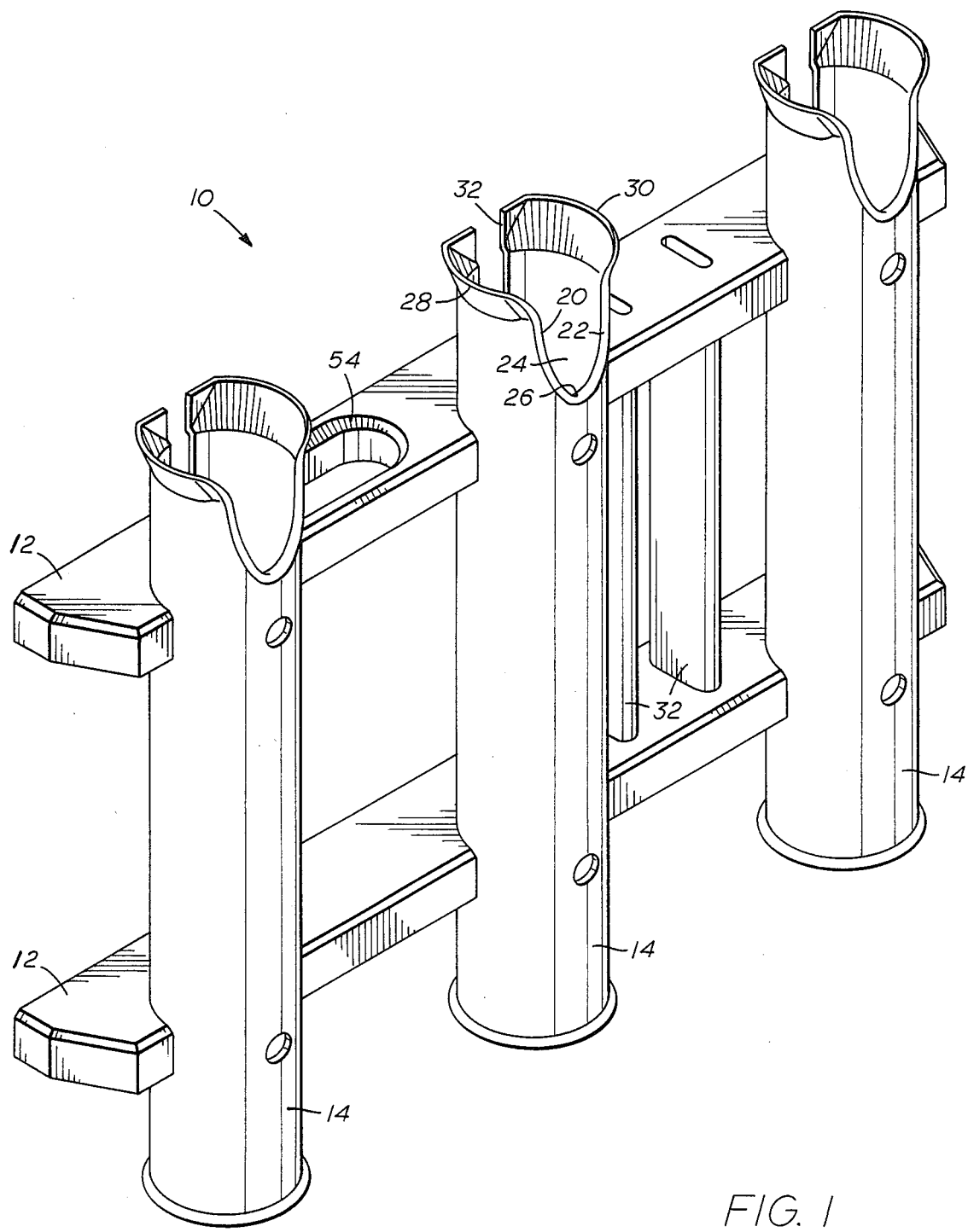
FIG. 1 is a perspective elevational view of one embodiment of the present invention.

Referring now to the drawings, the reference numeral 10 generally indicates the fishing rod holder of the present invention combined wtih various accessory holders.

Figure 2:
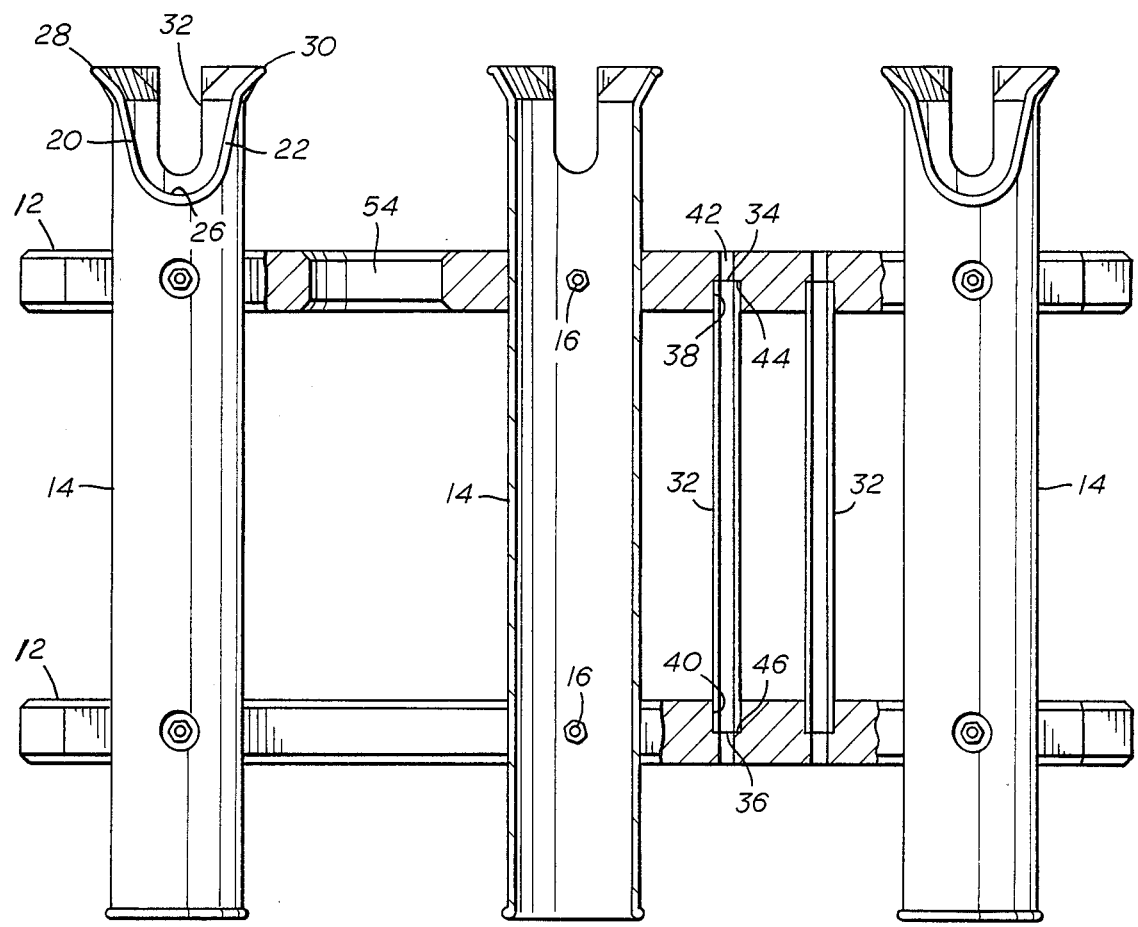
FIG. 2 is an elevational view, partly in cross section, of the apparatus of FIG. 1.

The apparatus 10 generally includes a plurality of horizontally spaced supports 12, here shown as two for convenience, which are adapted to be secured upon a boat and in turn support a plurality of vertically extending tubular rod holders 14, here shown as three. While the horizontal supports 12 may be of any suitable material, one satisfactory material is teakwood, and while the tubular rod holders 14 may be of various types of material, plastic material is satisfactory. As best seen in FIG. 2, the rod holders 14 are secured to and supported from the horizontal supports 12, such as by nuts and bolts 16. However, when the apparatus 10 is placed upon a boat and fishing rods and reels are inserted into the inside of the holders 14 they are still subjected to violent motion, movement and possible damage due to the boat movement. The tops of the rod holders 14 include configurations which act to receive a fishing rod and positioned and hold various sizes, shapes and configurations of reels such as spinning reels and casting reels.

Each of the rod holders 14 include at the top a first downward and inwardly tapered slot 24 formed by downwardly and inwardly tapered sides 20 and 22 and having a bottom 26. The sides 20 and 22 act to guide the base of a reel into the slot and move downwardly so as to rotatably position the fishing rod in the holder 14. Also the converging sides 20 and 22 will accommodate various sized and shaped configurations of reel connections to the rod while at the same time supporting and guiding the rod. It is also to be noted that the slot 24 between the sides 20 and 22 is in a plane which is positioned at an angle to the longitudinal axis of the rod holder 14. That is, the sides 20 and 22 are directed upwardly and inwardly to provide a surface which will move between a reel and its attached rod for more securely wedging and holding the rod in the holder 14.

In addition, the top of the rod holders 14 include downwardly and inwardly tapered sides 28 and 30 which allows ease of positioning the end of a fishing rod into a holder 14. Also, a second downwardly extending slot 32 is provided extending from the top of the holder 14 and positioned diametrically opposed to the first slot 24. The slots 32 are provided to accept and coact with any finger grip that may be present on certain types of rods.

However, it is desirable that other fishing accessories be located adjacent to the fishing rod holders 14 for convenience. Therefore, one or more enclosures 32 are provided extending vertically between and supported from two of the horizontally spaced supports 12 in which the enclosures are shaped to receive a knife blade. That is, it is important that the sharp edges of a knife blade not be exposed because of the danger of injury to people using the fishing equipment. Preferably, the enclosures 32, for convenience and ease of manufacture, are supported and positioned in recesses in the horizontal supports 12. That is, the ends 32 and 36 of the enclosures 32 are positioned in recesses 38 and 40, respectively. The top horizontal support 12 includes an opening 42 which is aligned with the interior of the enclosures 32 for inserting a knife blade into the interior of the enclosures 34 while the handle of the knife is supported from the top of the top horizontal support 12.

Any suitable means are provided for fastening at least one end of the enclosures 32 to a horizontal support 12 and preferably both ends are fastened to a horizontal support. One form of fastening means, as best seen in FIG. 2, is that the recesses 38 and 40 include a shoulder 44 and 46, respectively, for coacting with the ends 34 and 36 of the enclosures 32. Thus, the recess 38 and shoulder 44 securely fasten the top end 34 in place and the lower recess 40 and shoulder 46 securely hold the bottom end 36 of the enclosure 32 in place.

Figure 3:
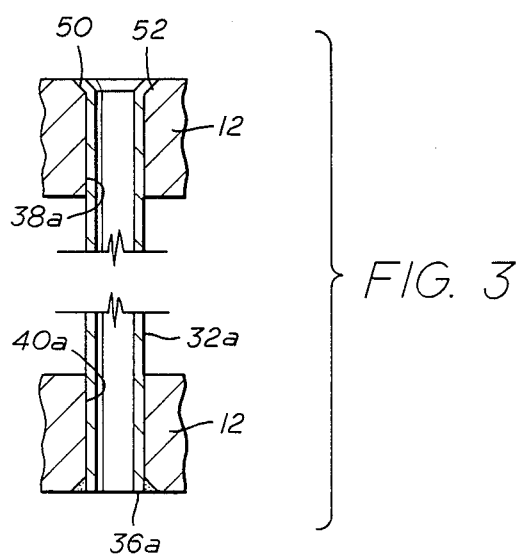
FIG. 3 is a fragmentary elevational view of another embodiment of the knife holder used in the present invention.

Of course, other and further types of fasteners may be used to fasten the ends of the enclosures 32 to the horizontal supports 12. For example, the ends 34 and 36 could be glued, stapled, wedged, pressed fit, or otherwise secured. For example, a further embodiment is best seen in FIG. 3 in which an enclosure 32a is secured and held in place between an upper and lower horizontal support 12. The enclosure 32a includes a top which includes a flared shoulder 50 for coacting with a flared shoulder 52 in the upper horizontal support 12. In this embodiment the bottom 36a may be glued or otherwise secured to the lower horizontal support 12 but this is not necessary as the recess 40a is sufficient to secure the lower end 36a. In addition the supports 12 may include an opening 54 for holding a pair of fish pliers.

The present invention, therefore, is well adapted to carry out the objects and attain the ends and advantages mentioned as well as other inherent therein. While presently preferred embodiments of the invention have been given for the purpose of disclosure, numerous changes in the details of construction will be readily apparent to those skilled in the art and which are encompassed within the spirit of the invention and the scope of the appended claims.

What is claimed is:
1. A fishing rod holder comprising,
a plurality of horizontally spaced supports adapted to be secured to a boat,
a plurality of vertically extending tubular rod holders connected to and supported from the horizontal supports,
the top of each rod holder including a first downwardly and inwardly tapered slot for receiving and holding a reel and a second downwardly extending slot diametrically opposed to the first slot,
an enclosure extending vertically between and supported from two of said horizontally spaced supports, said enclosure forming a sheath shaped to receive and entirely cover a knife blade, ends of said enclosure being positioned in recesses in said two horizontally spaced supports.
2. The apparatus of claim 1 wherein the first slot is in a plane positioned at an angle to the longitudinal axis of the tubular rod holder.

* * * * *